(12) United States Patent
Blankenship et al.

(10) Patent No.: US 9,935,696 B2
(45) Date of Patent: Apr. 3, 2018

(54) SYSTEM AND METHOD FOR MULTIPLEXING CONTROL AND DATA CHANNELS IN A MULTIPLE INPUT, MULTIPLE OUTPUT COMMUNICATIONS SYSTEM

(71) Applicant: FutureWei Technologies, Inc., Plano, TX (US)

(72) Inventors: Yufei Blankenship, Kildeer, IL (US); Weimin Xiao, Hoffman Estates, IL (US); Ying Jin, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/400,709

(22) Filed: Jan. 6, 2017

(65) Prior Publication Data

US 2017/0149481 A1 May 25, 2017

Related U.S. Application Data

(63) Continuation of application No. 15/047,493, filed on Feb. 18, 2016, now Pat. No. 9,544,034, which is a
(Continued)

(51) Int. Cl.
*H04L 27/00* (2006.01)
*H04B 7/0456* (2017.01)
(Continued)

(52) U.S. Cl.
CPC ......... *H04B 7/0456* (2013.01); *H04B 7/0632* (2013.01); *H04B 7/0639* (2013.01);
(Continued)

(58) Field of Classification Search
CPC .. H04B 7/0413; H04B 7/0617; H04B 7/0669; H04L 1/0026; H04L 1/06; H04L 1/0618; H04L 5/0023; H04L 1/003
(Continued)

(56) References Cited

U.S. PATENT DOCUMENTS

2008/0186934 A1 8/2008 Khan et al.
2009/0304109 A1 12/2009 Kotecha
(Continued)

FOREIGN PATENT DOCUMENTS

CN 101536358 A 9/2009
CN 101695017 A 4/2010
(Continued)

OTHER PUBLICATIONS

Ericsson, et al., "Resource Allocation for UCI on PUSCH", TSG-RAN WG1 #61bis, R1-103845, Jun. 28,-Jul. 2, 2010, 12 pages, Dresden, Germany.
(Continued)

*Primary Examiner* — Chieh M Fan
*Assistant Examiner* — Fitwi Hailegiorgis
(74) *Attorney, Agent, or Firm* — Slater Matsil, LLP

(57) ABSTRACT

A system and method for system and method for multiplexing control and data channels in a multiple input, multiple output (MIMO) communications system are provided. A method for transmitting control symbols and data symbols on multiple MIMO layers includes selecting a first set of codewords from $N_{cw}$ codewords, distributing control symbols onto the first set of layers, placing data symbols of the first set of codewords onto the first set of layers, placing data symbols of the $(N_{cw}-N_{cw1})$ remaining codewords to remaining layers if $N_{cw} > N_{cw1}$, and transmitting the multiple MIMO layers. The first set of codewords is associated with a first set of layers from the multiple MIMO layers, and the $N_{cw}$ codewords are to be transmitted simultaneously and the first set of codewords comprises $N_{cw1}$ MIMO codewords, where $N_{cw}$ and $N_{cw1}$ are integers greater than or equal to 1. The remaining layers are MIMO layers from the multiple MIMO layers not in the first set of layers.

21 Claims, 6 Drawing Sheets

Related U.S. Application Data continuation of application No. 12/856,333, filed on Aug. 13, 2010, now Pat. No. 9,270,427.

(60) Provisional application No. 61/293,985, filed on Jan. 11, 2010.

(51) Int. Cl.
| | |
|---|---|
| H04L 5/00 | (2006.01) |
| H04B 7/06 | (2006.01) |
| H04L 27/26 | (2006.01) |
| H04L 1/18 | (2006.01) |
| H04W 72/04 | (2009.01) |
| H04L 1/00 | (2006.01) |

(52) U.S. Cl.
CPC ............ *H04L 1/0003* (2013.01); *H04L 1/007* (2013.01); *H04L 1/0073* (2013.01); *H04L 1/1861* (2013.01); *H04L 5/006* (2013.01); *H04L 5/0023* (2013.01); *H04L 5/0055* (2013.01); *H04L 5/0057* (2013.01); *H04L 27/2627* (2013.01); *H04W 72/0413* (2013.01); *H04L 1/0026* (2013.01)

(58) Field of Classification Search
USPC ........................................ 375/295, 296, 298
See application file for complete search history.

(56) References Cited

U.S. PATENT DOCUMENTS

| | | | |
|---|---|---|---|
| 2010/0002790 | A1 | 1/2010 | Onggosanusi et al. |
| 2010/0027697 | A1 | 2/2010 | Malladi et al. |
| 2010/0034310 | A1 | 2/2010 | Nam et al. |
| 2010/0041350 | A1 | 2/2010 | Zhang et al. |
| 2010/0067512 | A1 | 3/2010 | Nam et al. |
| 2010/0080154 | A1 | 4/2010 | Noh et al. |
| 2010/0098012 | A1 | 4/2010 | Bala et al. |
| 2010/0195566 | A1 | 8/2010 | Krishnamurthy et al. |
| 2010/0195594 | A1 | 8/2010 | Seo et al. |
| 2010/0195615 | A1 | 8/2010 | Lee et al. |
| 2010/0195624 | A1 | 8/2010 | Zhang et al. |
| 2010/0202561 | A1 | 8/2010 | Gorokhov et al. |
| 2010/0208680 | A1 | 8/2010 | Nam et al. |
| 2010/0239040 | A1 | 9/2010 | Beluri et al. |
| 2010/0246705 | A1 | 9/2010 | Shin et al. |
| 2010/0322343 | A1 | 12/2010 | Yeon et al. |
| 2011/0019764 | A1 | 1/2011 | Chung et al. |
| 2011/0057218 | A1 | 3/2011 | Sorg et al. |
| 2011/0103498 | A1 | 5/2011 | Chen et al. |
| 2011/0142107 | A1 | 6/2011 | Pan et al. |
| 2011/0228759 | A1 | 9/2011 | Futagi et al. |
| 2011/0274075 | A1 | 11/2011 | Lee et al. |
| 2013/0128845 | A1 | 5/2013 | Cheon et al. |

FOREIGN PATENT DOCUMENTS

| | | |
|---|---|---|
| CN | 101702631 A | 5/2010 |
| CN | 101807974 A | 8/2010 |
| EP | 2523517 A1 | 11/2012 |
| JP | 201087634 A | 4/2010 |
| JP | 2010541222 | 12/2010 |
| JP | 2011526094 A | 9/2011 |
| JP | 2012516622 A | 7/2012 |
| JP | 2013516873 A | 5/2013 |
| KR | 20110039574 A | 4/2011 |
| RU | 2298876 C2 | 5/2007 |
| WO | 2008058112 A2 | 5/2008 |
| WO | 2009042290 A1 | 4/2009 |
| WO | 2009110759 A2 | 9/2009 |
| WO | 2009128604 A1 | 10/2009 |
| WO | 2010032953 A2 | 3/2010 |
| WO | 2010064407 A1 | 6/2010 |
| WO | 2010087641 A2 | 8/2010 |
| WO | 2010101414 A2 | 9/2010 |
| WO | 2011082828 A1 | 7/2011 |

OTHER PUBLICATIONS

Huawei; "Channel Interleaver and Codeword-to-Layer Mapping for LTE-A Uplink Spatial Multiplexing", 3GPP TSG RAN WG1 Meeting #58, R1-093054, Aug. 24-28, 2009, 9 pages, Shenzhen, China.
3rd Generation Partnership Project, Technical Specification Group Radio Access Network; Evolved Universal Terrestrial Radio Access (E-UTRA); Physical Channels and Modulation, Release 9, Dec. 2009, 3GPP TS 36.211 V9.0.0, 85 pages.
3rd Generation Partnership Project; Technical Specification Group Radio Access Network; Evolved Universal Terrestrial Radio Access (E-UTRA); Physical Channels and Modulation (Release 8), 3GPP TS 36.211, V8.8.0, Sep. 2009, 83 pages.
3rd Generation Partnership Project; Technical Specification Group Radio Access Network; Evolved Universal Terrestrial Radio Access (E-UTRA); Multiplexing and channel coding (Release 8),3GPP TS 36.212, V8.8.0, Dec. 2009, 60 pages.
3rd Generation Partnership Project; Technical Specification Group Radio Access Network; Evolved Universal Terrestrial Radio Access (E-UTRA); Physical layer procedures (Release 8), 3GPP TS 36.213, V8.8.0, Sep. 2009, 77 pages.
3rd Generation Partnership Project; Technical Specification Group Radio Access Network; Further Advancements for E-UTRA Physical Layer Aspects (Release 9), 3GPP TR 36.814, V1.5.0, Nov. 2009, 53 pages.
Alcatel-Lucent Shanghai Bell, "HARQ Bundling with Layer Shifting for LTE-Advanced Uplink SU-MIMO", 3GPP TSG RAN WG1 Meeting #57, R1-092163, May 4-8, 2009, 5 pages, San Francisco, CA.
Alcatel-Lucent Shanghai Bell, et al., "Further Discussions on UCI Multiplexing on PUSCH in case of SU-MIMO", 3GPP TSG RAN WG1 Meeting #61bis, Agenda item: 6.4.2, R1-104163, Jun. 28,-Jul. 2, 2010, pp. 1-5.
Ericsson, et al., "Resource Allocation for UCI on PUSCH," TSG-RAN WG1 #62, Agenda item: 6.4.2, R1-104953, Aug. 23-27, 2010, 8 pages.
Huawei, "Multiplexing of Control and Data in Multi-layer PUSCH Transmission," 3GPP TSG RAN WG1 meeting 59#BIS, Agenda item 7.3.3, R1-100261, Jan. 18-22, 2010, 6 pages.
LG Electronics, "UCI Multiplexing for Multi-layer PUSCH Transmission" 3GPP TSG RAN WG1 #61bis, Agenda item: 6.4.2, R1-103974, Jun. 28,-Jul. 2, 2010, 5 pages.
Motorola, "UCI Multiplexing on PUSCH in UL-MIMO Transmissions" 3GPP TSG RAN1#61b, Agenda item: 6.4.2, R1-103916, Jun. 28,-Jul. 2, 2010, 7 pages.
Qualcomm Europe, "Further Link Analyses of SU-MIMO Operation of UL of LTE-A" 3GPP TSG-RAN WG1 #58bis, Agenda item: 7.6.3, R1-094222, Oct. 12-16, 2009, pp. 1-9.
Samsung, "Further Discussion on Data and Control Multiplexing in UL MIMO Transmissions" 3GPP TSG RAN WG1 #61bis, Agenda item: 6.4.2, R1-103675, Jun. 28,-Jul. 2, 2010, pp. 1-6.
Samsung, "Further Discussion on Data and Control Multiplexing in UL MIMO Transmissions" 3GPP TSG WG1 #62, Agenda item: 6.4.2, R1-104614, Aug. 23-27, 2010, pp. 1-8.
Huawei: "Remaining Issues of Multiplexing Schemes of Control and Data in Multi-Layer PUSCH Transmission," 3GPP TSG RAN WG1 Meeting #61bis, R1-103451, Jun. 28,-Jul. 2, 2010, 5 pages, Dresden, Germany.
ZTE: "UCI Multiplexing on PUSCH With MIMO Transmission", 3GPP TSG-RAN WG1 Meeting #61bis, R1-103601, Jun. 28,-Jul. 2, 2010, 4 pages, Dresden, Germany.

SYSTEM AND METHOD FOR MULTIPLEXING CONTROL AND DATA CHANNELS IN A MULTIPLE INPUT, MULTIPLE OUTPUT COMMUNICATIONS SYSTEM

CROSS-REFERENCE TO RELATED APPLICATIONS

This application is a Continuation Application of U.S. patent application Ser. No. 15/047,493, filed on Feb. 18, 2016, which is a Continuation of U.S. patent application Ser. No. 12/856,333, filed on Aug. 13, 2010, now U.S. Pat. No. 9,270,427, issued on Feb. 23, 2016, which claims the benefit of U.S. Provisional Application No. 61/293,985, filed on Jan. 11, 2010, which applications are hereby incorporated herein by reference.

TECHNICAL FIELD

The present invention relates generally to wireless communications, and more particularly to a system and method for multiplexing control and data channels in a multiple input, multiple output (MIMO) communications system.

BACKGROUND

For 3GPP Rel-8 (commonly referred to as Long Term Evolution (LTE)), broadly speaking, uplink control information may be sent in two ways: (a) without simultaneous transmission of data (i.e., uplink shared channel (UL-SCH)); and (b) with simultaneous transmission of UL-SCH. Here we are concerned with (b) where control and data are sent on the same subframe.

When user equipment (UE) has a valid scheduling grant, network resources are assigned for the UL-SCH in a corresponding subframe. In the subframe, the uplink layer 1 (L1)/layer 2 (L2) control signaling may be multiplexed with the coded UL-SCH onto a physical uplink shared channel (PUSCH) prior to modulation and discrete Fourier transform (DFT) transform precoding. The control signaling may include hybrid automatic repeat request (HARQ) acknowledgements and channel status reports.

SUMMARY

These and other problems are generally solved or circumvented, and technical advantages are generally achieved, by embodiments of a system and method for multiplexing control and data channels in a multiple input, multiple output (MIMO) communications system.

In accordance with an embodiment, a method for transmitting control symbols and data symbols on multiple input, multiple output (MIMO) layers is provided. The method includes selecting a first set of codewords from $N_{cw}$ codewords, distributing control symbols onto the first set of layers, placing data symbols of the first set of codewords onto the first set of layers, placing data symbols of the $(N_{cw}-N_{cw1})$ remaining codewords to remaining layers if $N_{cw}>N_{cw1}$, and transmitting the multiple MIMO layers. The first set of codewords is associated with a first set of layers from the multiple MIMO layers, and the $N_{cw}$ codewords are to be transmitted simultaneously and the first set of codewords comprises $N_{cw}$ MIMO codewords, where $N_{cw}$ and $N_{cw1}$ are integers greater than or equal to 1. The remaining layers are MIMO layers from the multiple MIMO layers not in the first set of layers.

In accordance with an embodiment, a method for transmitting control symbols and data symbols on multiple input, multiple output (MIMO) layers is provided. The method includes constructing one or more codewords to be simultaneously transmitted over a plurality of MIMO layers, distributing control symbols over the plurality of MIMO layers, placing data symbols of the one or more codewords onto the plurality of MIMO layers, and transmitting the multiple MIMO layers.

In accordance with an embodiment, a method for transmitting control symbols and data symbols on multiple input, multiple output (MIMO) layers is provided. The method includes selecting a codeword from a plurality of codewords, distributing control symbols onto the subset of MIMO layers, placing data symbols of the plurality of codewords onto the plurality of layers, and transmitting the multiple MIMO layers. The plurality of codewords are to be transmitted over a plurality of MIMO layers, and the selected codeword is to be transmitted over a subset of MIMO layers of the plurality of MIMO layers.

An advantage of an embodiment is that control signals multiplexed onto multiple MIMO layers may help with diversity processing gain.

Yet another advantage of an embodiment is that multiplexing the control signals onto multiple MIMO layers based on the type, requirements, and nature of the control information is transmitted. For example, CQI/PMI control signals may be mapped onto different MIMO layers or CWs or number of MIMO layers than HARQ ACK/NACK or RI.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
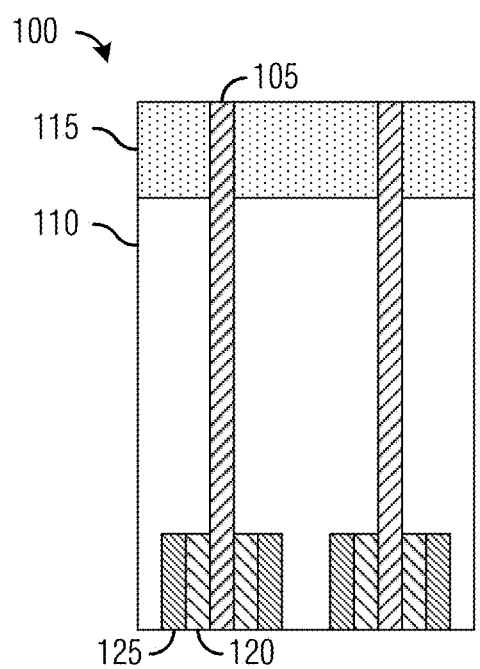
FIG. 1 is a space diagram of a multiplexing of control and data in LTE.

FIG. 1 illustrates space diagram 100 of a multiplexing of control and data in LTE. As shown in FIG. 1, control and data are multiplexed onto a single uplink layer. Space diagram 100 may be partitioned into different zones with the zones carrying different information. Zones hashed with a similar hashing pattern carry similar information. For example, zone 105 may be used to carry a reference signal, e.g., a pilot. While zone no may be used to carry UL-SCH data, zone 115 may be used to carry channel quality indicator and/or precode matrix indication information, zone 120 may be used to carry ACKs/NACKs used in HARQ, and zone 125 may be used to carry rank indicator information.

Each zone may contain a plurality of resource elements (REs) with an exact number of resource elements assigned to an individual zone being dependent on factors such as coding and modulation scheme being used, communications system configuration, number of UE operating, and so forth. The proportions of the various zones shown in space diagram 100 are not intended to illustrate precise relationships of the amount of resource elements allocated to the various zones, but to convey a relative relationship and arrangement of the zones.

For 3GPP Rel-10 (commonly referred to as LTE-Advanced (LTE-A)), a transmission block (TB) may be mapped to a MIMO codeword (CW) after a chain of processing including channel coding, rate matching, modulation, and so on, the same as in LTE. However, the maximum number of MIMO layers in LTE-A uplink is increased to four and the maximum number of MIMO codewords is increased to two.

Figure 2:
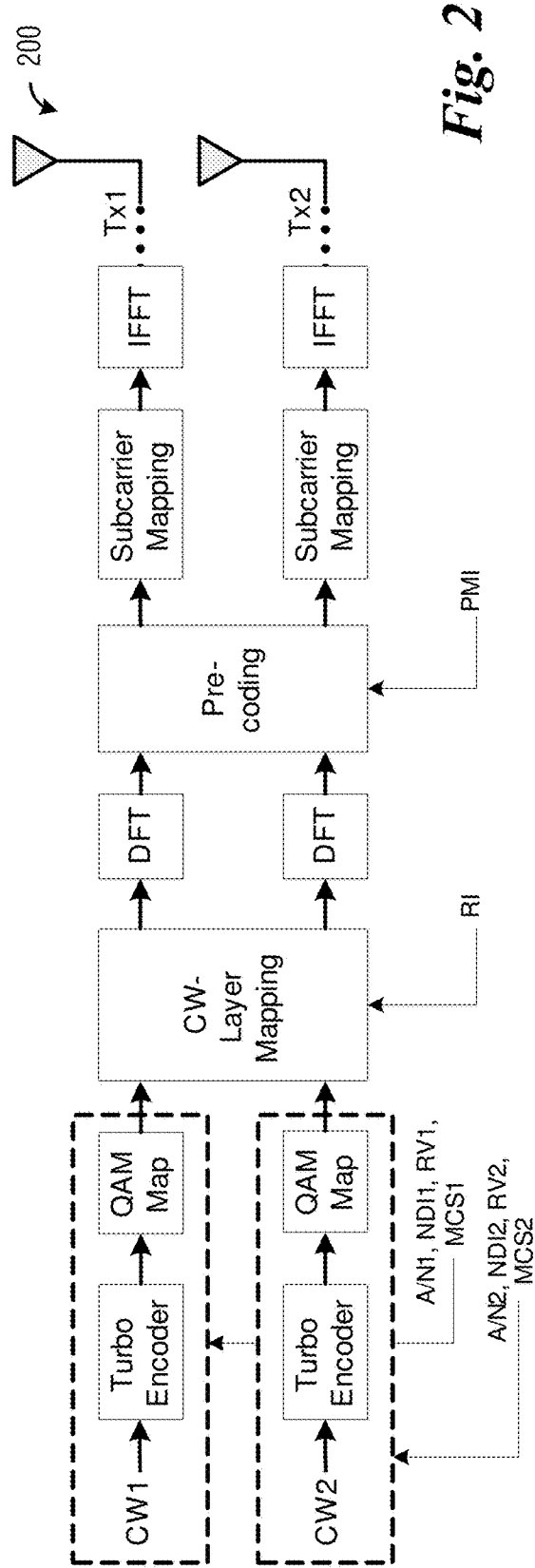
FIG. 2 is a diagram of a transmitter structure of rank-2 UL transmission using two TBs for two transmit antennas in the case of no ACK/NACK spatial bundling without layer shifting.
Figure 3:
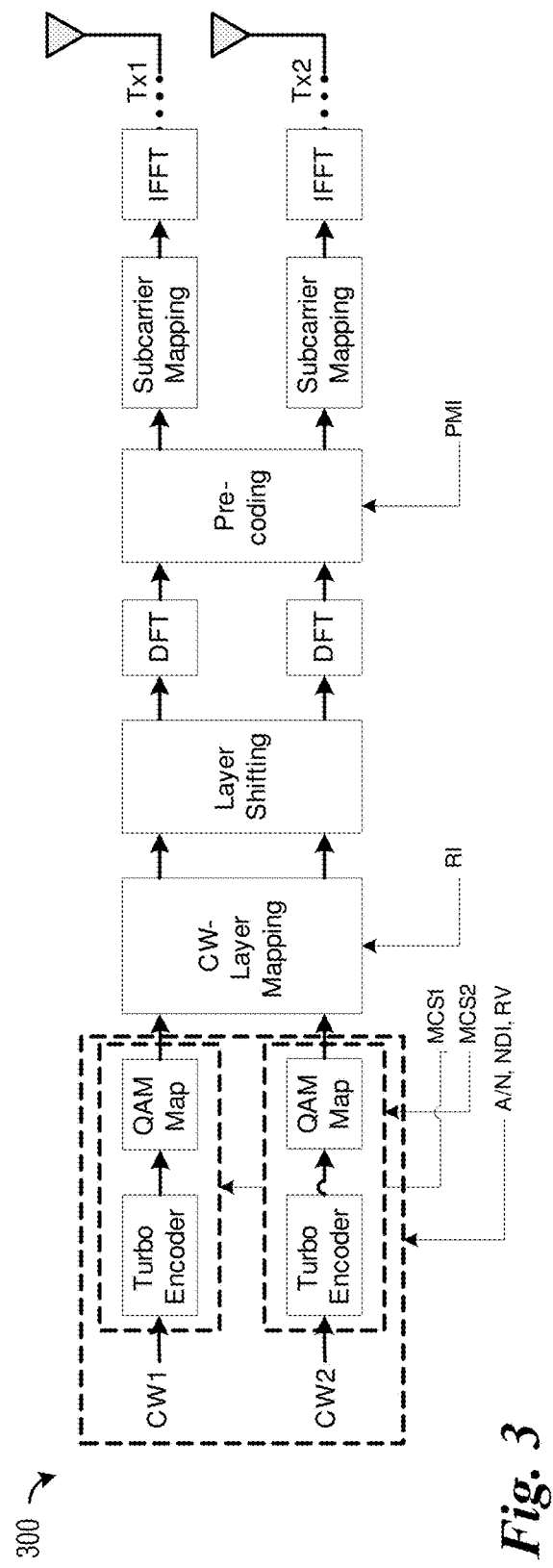
FIG. 3 is a diagram of a transmitter structure of rank-2 UL transmission using two TBs for two transmit antennas in the case of ACK/NACK spatial bundling with layer shifting.

In contrast to downlink MIMO, uplink (UL) MIMO of LTE-A is considering adopting layer shifting together with ACK/NACK spatial bundling in the processing chain. FIG. 2 illustrates a transmitter structure 200 of rank-2 UL transmission using two TBs for two transmit antennas in the case of no ACK/NACK spatial bundling without layer shifting. FIG. 3 illustrates a transmitter structure 300 of rank-2 UL transmission using two TBs for two transmit antennas in the case of ACK/NACK spatial bundling with layer shifting.

Figure 4A:
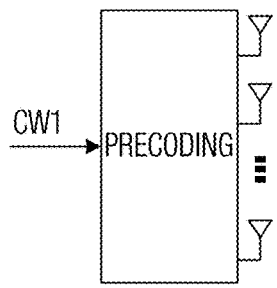
FIG. 4a is a diagram of a single codeword to a single layer mapping in LTE.
Figure 4B:
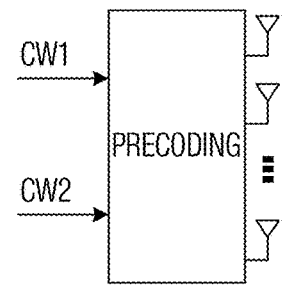
FIG. 4b is a diagram of a mapping of two codewords to two layers.
Figure 4C:
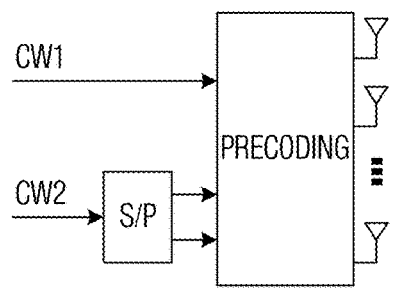
FIG. 4c is a diagram of a mapping of two codewords to three layers.
Figure 4D:
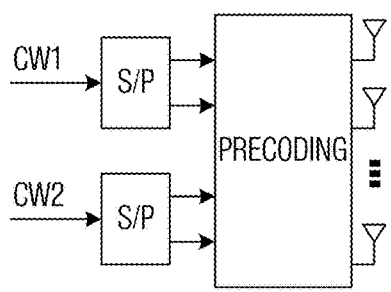
FIG. 4d is a diagram of a mapping of two codewords to four layers.
Figure 4E:
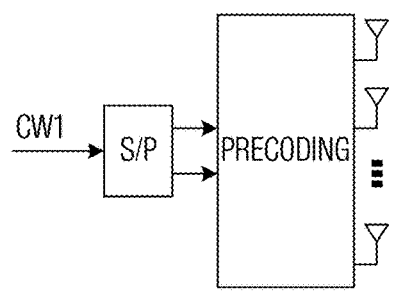
FIG. 4e is a diagram of a mapping of one codeword to two layers.

FIG. 4a illustrates a single codeword to a single layer mapping in LTE. FIG. 4b illustrates a mapping of two codewords to two layers. FIG. 4c illustrates a mapping of two codewords to three layers. FIG. 4d illustrates a mapping of two codewords to four layers. FIG. 4e illustrates a mapping of one codeword to two layers. If the design used in DL LTE is used, then the mapping shown in FIG. 4e may only be used for retransmissions where an initial transmission used two layers to send the TB. Further, the combinations of codeword (CW) to layer mapping shown in FIG. 4a through FIG. 4e can be used for LTE-Advanced uplink.

As stated in TR36.814, "simultaneous transmission of uplink L1/L2 control signaling and data is supported through two mechanisms:

Control signaling is multiplexed with data on PUSCH according to the same principle as in Rel-8

Control signaling is transmitted on physical uplink control channel (PUCCH) simultaneously with data on PUSCH."

Although control may be transmitted on PUCCH simultaneously with data on PUSCH, control signaling multiplexing with data on PUSCH is still needed for at least the following cases:

Multiplexing data and control on PUSCH reduces CM and hence increases the coverage.

When CQI/PMI/RI and maybe other channel state information is triggered by PDCCH that assigns UL-SCH transmission, such control information has to be multiplexed together with data on PUSCH.

When only one MIMO layer is being used, the same control-data multiplexing scheme as described for 3GPP Release-8 should be used (shown in FIG. 1). New designs of control-data multiplexing are discussed below for cases with multiple MIMO layers, e.g., one or more codewords mapped to two, three, or four MIMO layers (shown in FIGS. 4b through 4e).

The multiplexing of control-data to multiple MIMO layer PUSCH transmission may take several approaches: single codeword or all codewords.

Single codeword rule—Select layers associated with one of the codewords for control-data multiplexing. A criteria or rule may be needed to select an appropriate codeword. The codeword may be selected explicitly (for example, select a first codeword) via higher layer signaling or dynamic physical downlink control channel (PDCCH) signaling. Alternatively, the codeword may be selected implicitly using a) a codeword's modulation and coding scheme (MCS) level as provided in the PDCCH that assigns the PUSCH, b) a codeword's signal plus interference to noise ratio (SINR), c) a number of layers occupied by a codeword, d) an impact of a codeword on PUSCH performance, e) HARQ transmission status, for example, initial versus re-transmissions or a combination thereof.

All codewords rule—Use all the MIMO layers for control-data multiplexing. When one codeword is mapped to two layers, the single codeword strategy degenerates to the all codewords strategy.

The performance comparison and selection for a final solution depends heavily on whether ACK/NACK spatial bundling (LS/ANB) with layer shifting is used for UL MIMO transmissions. Further considerations may include the type of receiver (successive interference cancellation (SIC) versus minimum mean-square error (MMSE)) that an enhanced NodeB (eNB) is likely to implement, whether re-transmission is on one of the codewords in case of no LS/ANB, size (number of bits) of the control information (relative to that of the PUSCH resource allocated). In addition, different consideration may be needed for CQI/PMI versus ACK/NACK and RI for diversity and coverage purposes. For example, CQI/PMI may be mapped to different layers or CWs, or a different number of layers or CWs, than the ACK/NACK or RI.

Although LTE control information, such as ACK/NACK, RI, CQI/PMI, is discussed herein, other control signaling, such as carrier indicators, may be processed in a similar manner in LTE-A.

Control Information on a Single Codeword.

Since control information is important for the proper functioning of a communications system, they need to be protected as much as possible to that they may be received by the eNB correctly. Furthermore, the control information is relatively small and is protected by relatively weak codes, such as block codes and convolutional codes, thus a physical channel with better quality should be used to carry the control information.

Therefore, if there are multiple MIMO layers, design considerations may include:

The control information should be mapped to layers with better quality. For example, for two codewords mapped to two layers, assuming that layer two is better than layer one, then the control information should be mapped to layer two, leaving layer one completely for data only.

It may be simpler for the receiver if the control information is mapped to layers belonging to a same codeword.

If the control information is to be multiplexed with a codeword X, the control information should be mapped to all layers of codeword X. Doing so allows the control information to take advantage of diversity between layers.

If the control information is mapped to multiple layers, it should occupy the same resource elements across the multiple layers.

Thus for the codeword-to-layer mapping scenarios shown in FIGS. 4a through 4e, the control-data multiplexing is as follows. In the figures to be discussed below, the illustrated locations of the control signals, e.g., FIGS. 1, 5-8, the amount of resource elements allocated for each type of control signaling is for illustration only. As in LTE, the number of modulation symbols for each type of control signaling will be calculated as a function of several variables. Then a rule may be used to assign the modulation symbols to the resource elements till all the modulation symbols are exhausted. The number of modulation symbols allocated in each layer/slot may vary.

One codeword mapped to one layer: Reuse 3GPP Release-8 design (FIG. 1).

Figure 5:
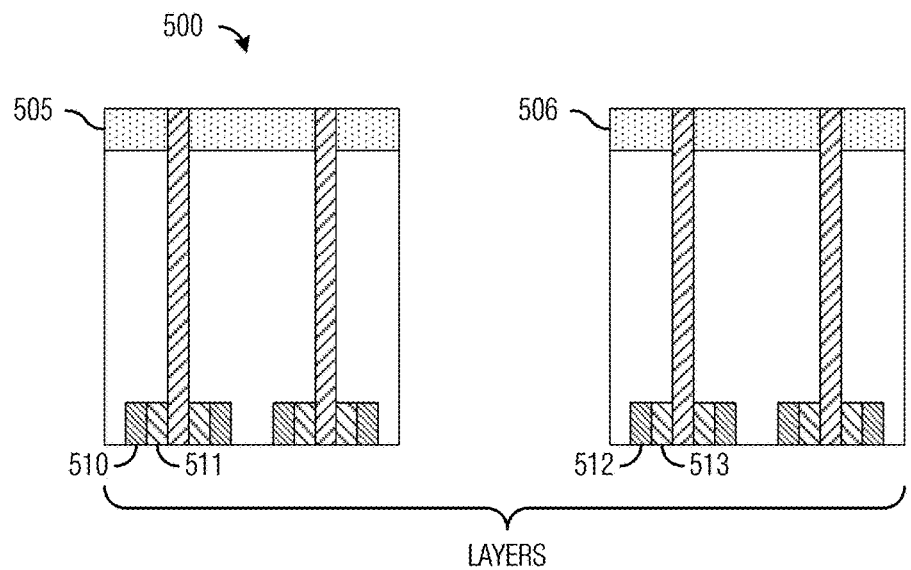
FIG. 5 is a space diagram of two MIMO layers containing control and data from a single codeword.

One codeword mapped to two layers: FIG. 5 illustrates a space diagram 500 of two MIMO layers containing control and data from a single codeword. Control information (contained in zone 505 and zone 506 as well as zones 510-513) may be multiplexed onto both layers, wherein control modulation symbols occupy the same (or approximately the same) resource elements in both layers. As illustrated in FIG. 5, the information carried over zones, such as zones 510-513, may be time-division multiplexed with the data. As specified in LTE Rel-8, zones 510-513 may also be used to carry HARQ ACK/NACK information and rank indicator (RI).

Figure 6:
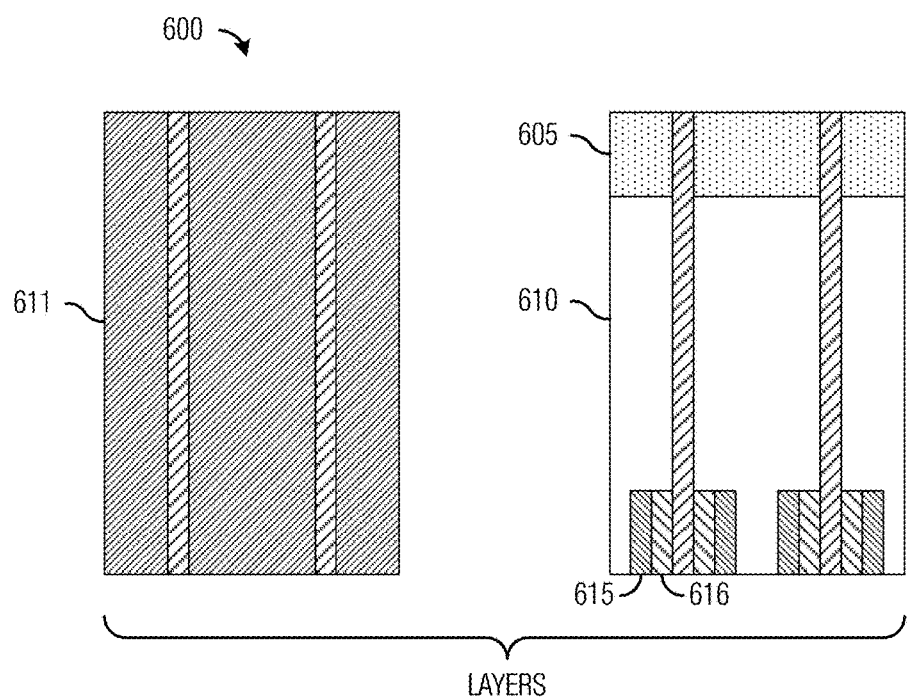
FIG. 6 is a space diagram of two MIMO layers containing control and data from two codewords.

Two codewords mapped to two layers: FIG. 6 illustrates a space diagram 600 of two MIMO layers containing control and data from two codewords. Map control information to a layer according to single codeword rule as discussed previously (zone 605 and zones 615 and 616). Let the layer carrying the control information be referred to as layer X. Within layer X, the multiplexing of control and data reuses the 3GPP Release-8 design. Here the control information includes not only CQI, ACK/NACK, RI used in Release-8, but it also includes any new type of control information that may be defined for Release-10 or later, e.g., indicator for carrier aggregation and COMP, etc. Zone 610 carries data from codeword with control and data, while zone 611 carries data from codeword with only data.

Figure 7:
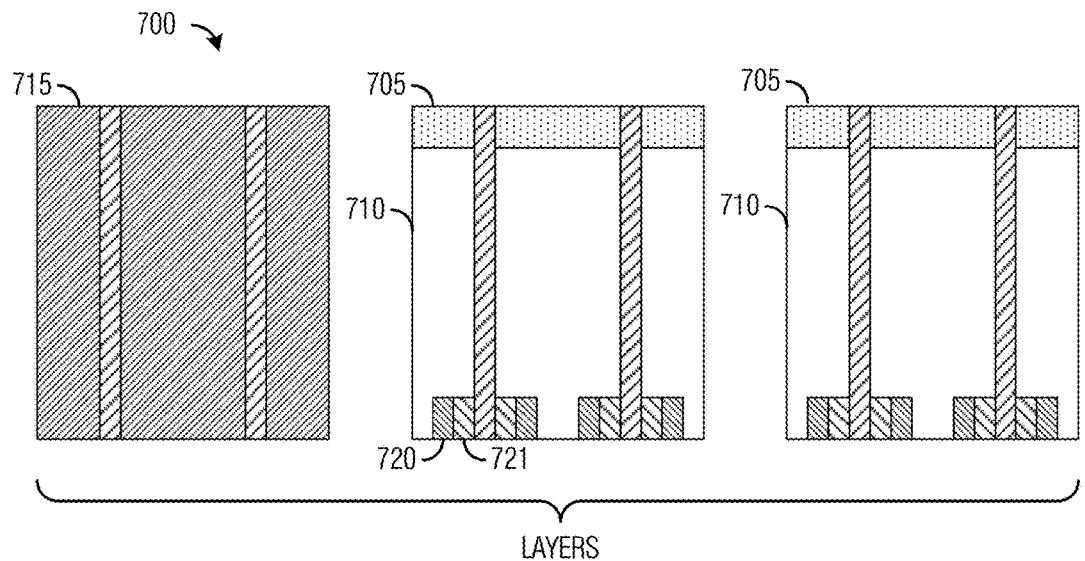
FIG. 7 is a space diagram of three MIMO layers containing control and data from two codewords.

Two codewords mapped to three layers: FIG. 7 illustrates a space diagram 700 of three MIMO layers containing control and data from two codewords. As shown in FIG. 7, a first codeword (let it be referred to as $CW_1$) is mapped to one layer and a second codeword (let it be referred to as $CW_2$) is mapped to two layers. Clearly, $CW_2$ contains twice as many modulation symbols as $CW_1$ if control information is excluded. Thus, if control information is punctured into the data modulation symbols, multiplexing control symbols with $CW_2$ may be better than multiplexing with $CW_1$ in terms of a number of data modulation symbols being punctured from a codeword. Zone 705 and zones 720 and 721 contain control information from codeword containing control and data, zone 710 contains data from codeword containing control and data, and zone 715 contains data from codeword containing only data.

Two codewords mapped to four layers: Each codeword is mapped to two MIMO layers. Let a first codeword where control information resides be denoted codeword X. Codeword X is selected according to single codeword rule as discussed previously. Within codeword X, multiplexing of control and data may be performed as with codeword $CW_2$ in the case with two codewords mapped to three layers.

Control Information on all Codewords.

Figure 8:
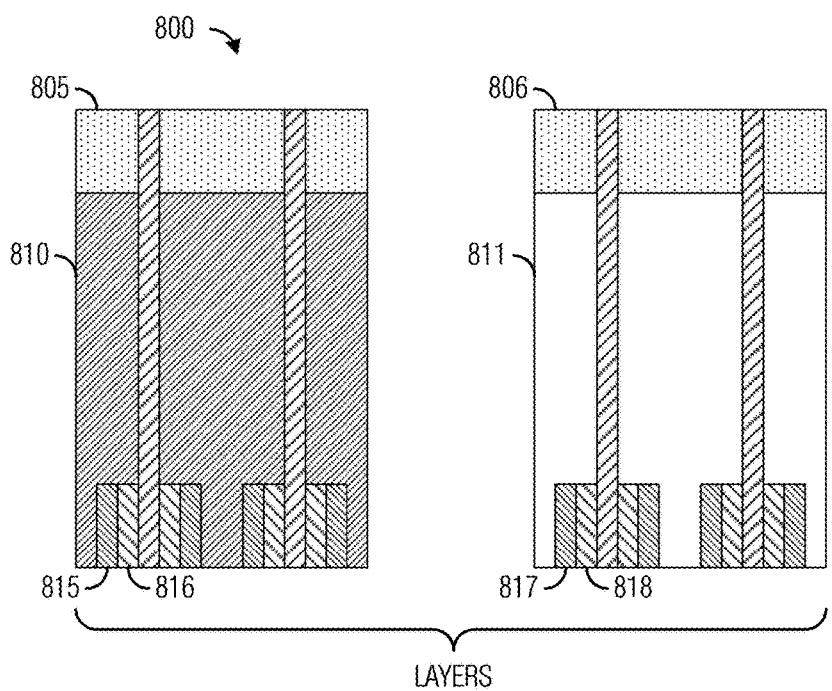
FIG. 8 is a space diagram of two MIMO layers containing control and data from two codewords.

In the situation where control information is contained in all codewords, then the control information may be always mapped to all MIMO layers. As discussed herein, all codewords means that there are two or more codewords. Therefore, situations where one codeword is mapped to one or two layers may not be considered. FIG. 8 illustrates a space diagram 800 of two MIMO layers containing control and data from two codewords. As shown in FIG. 8, control information may be mapped to both layers, while data from each of the two codewords are mapped to a single layer. The mapping of control and data from two codewords to two MIMO layers as shown in FIG. 8 may have an advantage of maximizing spatial diversity for the control information as well as better coverage of control information. Zones 805 and 806 as well as zones 815 through 818 carry control information from both codewords, while zone 810 carries data from a first codeword and zone 811 carries data from a second codeword.

However, resource assignment of control signaling may be difficult due to separate processing of two transmission blocks. For example, two transmission blocks may have different modulation orders, thereby causing control information to use two different modulation orders. If a SIC receiver is used, mapping control information to all layers may make it difficult to implement the cancellation. Additionally, if ACK/NACK spatial bundling with layer shifting is adopted, full or close to full spatial diversity may be available to each layer, making all codeword mapping even more unattractive.

In 3GPP Release-8, formulas for determining a number of coded symbols for HARQ-ACK or rank indicator and channel quality information are:

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$

and $$Q' = \min\left(\left\lceil\frac{(O+L)\cdot M_{sc}^{PUSCH-initial}\cdot N_{symb}^{PUSCH-initial}\cdot \beta_{offset}^{PUSCH}}{\sum_{r=0}^{C-1} K_r}\right\rceil, M_{sc}^{PUSCH}\cdot N_{symb}^{PUSCH} - \frac{Q_{RI}}{Q_m}\right).$$

To extend to multiple layer PUSCH transmissions, the formulas need to be updated as well. Note that while ACK/NACK, RI, and CQI are used as examples of control information, similar formula may be used to carry other types of control information, e.g., the indicator for carrier aggregation and COMP, etc. The formulas are not to be interpreted to be limited to any specific control information type. Formulas for the single codeword case are shown below.

ACK/NACK (RI) for single codeword:

$$Q' = \min\left(\left\lceil\frac{O\cdot M_{sc}^{PUSCH-initial}\cdot N_{symb}^{PUSCH-initial}\cdot N_{layer}\cdot \beta_{offset}^{PUSCH}}{\sum_{r=0}^{C-1} K_r}\right\rceil, 4\cdot M_{sc}^{PUSCH}\cdot N_{layer}\right),$$

where $N_{layer}$ is the number of layers for the multiplexing CW. In addition, the order of mapping REs across layers need to be defined.

CQI for single codeword:

$$Q' = \min\left(\left\lceil\frac{(O+L)\cdot M_{sc}^{PUSCH-initial}\cdot N_{symb}^{PUSCH-initial}\cdot N_{layer}\cdot \beta_{offset}^{PUSCH}}{\sum_{r=0}^{C-1} K_r}\right\rceil, M_{sc}^{PUSCH}\cdot N_{symb}^{PUSCH}\cdot N_{layer} - \frac{Q_{RI}}{Q_m}\right).$$

In addition, an order of mapping resource elements across layers need to be defined. Formulas for the all codeword case are shown below.

ACK/NACK for all codewords:

$$Q' = \min\left(\left\lceil\frac{O\cdot (N_{layer,1}+N_{layer,2})}{N_{layer,1}\cdot\frac{MPR_1}{\beta_1}+N_{layer,2}\cdot\frac{MPR_2}{\beta_2}}\right\rceil, 4\cdot M_{sc}^{PUSCH}\cdot (N_{layer,1}+N_{layer,2})\right)$$

$$= \min\left(\left\lceil\frac{O\cdot M_{sc}^{PUSCH-initial}\cdot N_{symb}^{PUSCH-initial}\cdot (N_{layer,1}+N_{layer,2})}{\frac{\sum_{r=0}^{C_1-1} K_{r,1}}{\beta_1}+\frac{\sum_{r=0}^{C_2-1} K_{r,2}}{\beta_2}}\right\rceil, 4\cdot M_{sc}^{PUSCH}\cdot (N_{layer,1}+N_{layer,2})\right)$$

$$= \min\left(\left\lceil\frac{O\cdot M_{sc}^{PUSCH-initial}\cdot N_{symb}^{PUSCH-initial}\cdot (N_{layer,1}+N_{layer,2})\cdot \beta_{offset}^{PUSCH}}{\sum_{r=0}^{C_1-1} K_{r,1}+\sum_{r=0}^{C_2-1} K_{r,2}}\right\rceil, 4\cdot M_{sc}^{PUSCH}\cdot (N_{layer,1}+N_{layer,2})\right)$$

The last step shown above assumes that the two codewords use the same offset value ($\beta$). $MPR_n$ (n=1, 2) is the spectral efficiency associated to the MCS level of codeword n. To derive this formula, a weighted (by number of layers of each codeword) average MPR may be used to calculate the number coded symbols for the control information while the original formula of LTE Release-8 uses the MPR of a single codeword. In addition, an order of mapping resource elements across layers and codewords need to be defined. In order to achieve diversity gain, the mapping may be first made across codewords/layers. In the case that different modulation levels are used in the two codewords, coding scheme of ACK/NACK and RI need to be modified.

CQI for all codewords:

$$Q' = \min\left(\left\lceil\frac{(O+L)\cdot M_{sc}^{PUSCH-initial}\cdot N_{symb}^{PUSCH-initial}\cdot (N_{layer,1}+N_{layer,2})\cdot \beta_{offset}^{PUSCH}}{\sum_{r=0}^{C_1-1} K_{r,1}+\sum_{r=0}^{C_2-1} K_{r,2}}\right\rceil, M_{sc}^{PUSCH}\cdot N_{symb}^{PUSCH}\cdot (N_{layer,1}+N_{layer,2}) - Q'_{RI}\right)$$

In addition, the order of mapping resource elements across layers and codewords need to be defined. In order to achieve diversity gain, the mapping may be first made across codewords/layers. In the case that different modulation levels are used in the two codewords, performance need to be verified.

Furthermore, rank dependent offset values may be considered for all cases where different values of the offset $\beta$ may be configured for different number of layers of PUSCH transmission.

Comparison of Options.

In Table 1, the Pros and Cons of Single Codeword and all Codeword Mapping Options are compared considering a variety of combinations. The comparison shows that single codeword options may be a simpler solution than the all codeword options.

Table 1. Comparison of Single-CW strategy with All-CW strategy under assumption of (a) layer shifting vs no layer shifting and (b) MMSE receiver vs SIC receiver.

|  |  | LS with ANB | No LS and ANB |
|---|---|---|---|
| MMSE receiver | Single-CW | Due to ANB, balancing the FER performance of the 2 CWs need to be considered. | Need to select a CW for multiplexing. |
|  | All-CWs | Same/similar MCS level is likely for both CWs. Due to ANB, balancing the FER performance of the 2 CWs should be easy for this setting. | Different MCS levels are likely for the 2 CWs which make it difficult to determine the number of coded symbols for the control information. |
| SIC receiver | Single-CW | Selecting CW for multiplexing could be tricky. Due to ANB, balancing the FER performance of the 2 CWs need to be considered. | Selecting CW for multiplexing could be tricky. |
|  | All-CWs | Different MCS levels may be used for the 2 CWs which make it difficult to determine the number of coded symbols for the control information. In addition, multiplexing control in both CWs may interrupt the SIC receiver behavior. Due to ANB, balancing the FER performance of the 2 CWs need to be considered. | Different MCS levels are likely for the 2 CWs which make it difficult to determine the number of coded symbols for the control information. In addition, multiplexing control in both CWs may interrupt the SIC receiver behavior. |

Advantageous features of embodiments of the invention may include: a method for transmitting control symbols and data symbols on multiple MIMO layers, the method comprising: selecting a first set of codewords associated with a first set of layers from the multiple MIMO layers from $N_{cw}$ codewords, wherein the $N_{cw}$ codewords are to be transmitted simultaneously and the first set of codewords comprises $N_{cw1}$ MIMO codewords, where $N_{cw}$ is an integer greater than or equal to 1; distributing control symbols onto the first set of layers; placing data symbols of the first set of codewords onto the first set of layers; placing data symbols of the ($N_{cw}-N_{cw1}$) remaining codewords to remaining layers if $N_{cw}>N_{cw1}$; and transmitting the multiple MIMO layers. The method could further include, wherein the first set of codewords comprises a single codeword. The method could further include, wherein the first set of codewords is selected by a communications device. The method could further include, wherein the first set of codewords is selected based on channel quality. The method could further include, wherein the first set of codewords is selected based on a modulating and coding scheme (MCS) level associated with the codewords. The method could further include, wherein the first set of codewords is selected based on the number of layers associated with the codewords. The method could further include, wherein the first set of codewords is selected based on a level of impact the control symbols have on the performance of the data transmission of each codeword. The method could further include, wherein the impact is a proportion of control symbols to data symbols for each codeword. The method could further include, wherein the first set of codewords is selected based on a hybrid automatic repeat request (HARQ) transmission status associated with the codewords. The method could further include, wherein the first set of codewords is selected by a controller serving a communications device. The method could further include, wherein the first set of codewords is signaled to the communications device via a downlink message. The method could further include, wherein the first set of codewords comprises $N_{cw}$ codewords. The method could further include, wherein distributing control symbols onto the first set of layers is based on the MCS levels of the first set of codewords. The method could further include, wherein distributing control symbols onto the first set of layers is based on a weighted MCS levels of the first set of codewords. The method could further include, wherein distributing control symbols onto the first set of layers comprises distributing control symbols substantially equally onto the first set of layers. The method could further include, wherein selecting a first set of codewords comprises selecting two different first set of codewords for two different types of control symbols.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting control modulation symbols and data modulation symbols of at least one codeword on a plurality of multiple input, multiple output (MIMO) layers, the method comprising:
   determining a number of control modulation symbols for each of the plurality of MIMO layers for physical uplink shared channel (PUSCH) transmission in accordance with a rank-dependent offset value of the at least one codeword, the rank-dependent offset value being different for different rank values, wherein a rank value indicates a number of MIMO layers for transmitting one or more codewords, the MIMO layers comprising one or more data information layers and one or more control information layers.

2. The method of claim 1, wherein the at least one codeword comprises a first codeword and a second codeword, the method further comprising:
   multiplexing a first type of the control modulation symbols of the at least one codeword onto the first codeword and multiplexing a second type of the control modulation symbols of the at least one codeword onto the first codeword and the second codeword; and mapping the first codeword to a first set of the MIMO layers and mapping the second codeword to a second set of the MIMO layers, wherein the first set of the MIMO layers is at least partially different from the second set of the MIMO layers.

3. The method of claim 2, wherein the first type of the control modulation symbols comprise at least one of channel quality information (CQI) and precoding matrix indicators (PMI), and the second type of the control modulation symbols comprise hybrid automatic repeat requested (HARQ) positive acknowledgement (ACK)/negative acknowledgement (NACK) information, and rank indication (RI) information.

4. The method of claim 2, wherein the first codeword and the second codeword use a same offset value.

5. The method of claim 2, wherein the first codeword is selected for the first type of the control modulation symbols according to a Modulation and Coding Scheme (MCS) level of the first codeword.

6. The method of claim 1, wherein the at least one codeword comprises a plurality of codewords, the method further comprising:

multiplexing a first type of the control modulation symbols of the at least one codeword onto a first set of the codewords and a second type of the control modulation symbols of the at least one codeword onto a second set of the codewords, wherein the first set of the codewords is at least partially different from the second set of the codewords.

7. The method of claim 1, wherein the control modulation symbols of the at least one codeword comprise at least one of channel quality information (CQI) and precoding matrix indicators (PMI).

8. The method of claim 1, wherein the control modulation symbols of the at least one codeword comprise at least one of hybrid automatic repeat requested (HARQ) positive acknowledgement (ACK)/negative acknowledgement (NACK) information, and rank indication (RI) information.

9. The method of claim 1, wherein the control modulation symbols of the at least one codeword are time division multiplexed with the data modulation symbols of the at least one codeword to time-align the control modulation symbols across the MIMO layers.

10. The method of claim 1, wherein the control modulation symbols of the at least one codeword are multiplexed to same resource elements across the MIMO layers.

11. A method for transmitting control modulation symbols and data modulation symbols on multiple input, multiple output (MIMO) layers, the method comprising:

multiplexing data modulation symbols and control modulation symbols of at least one codeword onto a plurality of multiple input, multiple output (MIMO) layers for a transmission, wherein the multiplexing comprises determining a number of control modulation symbols for each of the plurality of MIMO layers for physical uplink shared channel (PUSCH) transmission in accordance with an offset value of the at least one codeword that is dependent on a rank value for transmitting the at least one codeword, the offset value being different for different rank values, and the rank value indicating a number of the plurality of MIMO layers, wherein the plurality of MIMO layers comprises one or more data information layers and one or more control information layers; and transmitting the data modulation symbols and control modulation symbols of the at least one codeword on the plurality of MIMO layers on an uplink channel.

12. A system for transmitting control modulation symbols and data modulation symbols of at least one codeword on a plurality of multiple input, multiple output (MIMO) layers, the system comprising:

a transmitter configured to determine a number of control modulation symbols for each of the plurality of MIMO layers for physical uplink shared channel (PUSCH) transmission in accordance with an offset value of the at least one codeword, the offset value varying with a rank value for transmitting the at least one codeword, the offset value being different for different rank values, and the transmitter comprising a plurality of antennas for transmitting the control modulation symbols and the data modulation symbols of the at least one codeword on the plurality of MIMO layers, wherein the rank value indicates a number of the plurality of MIMO layers, wherein the plurality of MIMO layers comprises one or more data information layers and one or more control information layers.

13. The system of claim 12, wherein the at least one codeword comprises a first codeword and a second codeword, and the transmitter is further configured to:

multiplex a first type of the control modulation symbols of the at least one codeword onto the first codeword and multiplex a second type of the control modulation symbols of the at least one codeword onto the first codeword and the second codeword; and map the first codeword to a first set of the MIMO layers and map the second codeword to a second set of the MIMO layers, wherein the first set of the MIMO layers is at least partially different from the second set of the plurality of MIMO layers.

14. The system of claim 13, wherein the first type of the control modulation symbols comprise at least one of channel quality information (CQI) and precoding matrix indicators (PMI), and the second type of the control modulation symbols comprise hybrid automatic repeat requested (HARQ) positive acknowledgement (ACK)/negative acknowledgement (NACK) information, and rank indication (RI) information.

15. The system of claim 13, wherein the first codeword and the second codeword use a same offset value.

16. The system of claim 13, wherein the first codeword is selected for the first type of the control modulation symbols according to a Modulation and Coding Scheme (MCS) level of the first codeword.

17. The system of claim 12, wherein the at least one codeword comprises a plurality of codewords, and the transmitter is further configured to:

multiplex a first type of the control modulation symbols of the at least one codeword onto a first set of the codewords and a second type of the control modulation symbols of the at least one codeword onto a second set of the codewords, wherein the first set of the codewords is at least partially different from the second set of the codewords.

18. The system of claim 12, wherein the control modulation symbols of the at least one codeword comprise at least one of channel quality information (CQI) and precoding matrix indicators (PMI).

19. The system of claim 12, wherein the control modulation symbols of the at least one codeword comprise at least one of hybrid automatic repeat requested (HARQ) positive acknowledgement (ACK)/negative acknowledgement (NACK) information, and rank indication (RI) information.

20. The system of claim 12, wherein the antennas transmit the data modulation symbols and control modulation symbols of the at least one codeword on the plurality of MIMO layers on an uplink channel.

21. The system of claim 12, wherein the transmitter is further configured to multiplex the control modulation symbols of the at least one codeword to same resource elements across the plurality of MIMO layers.

* * * * *